(12) United States Patent
Yoshimura

(10) Patent No.: US 12,258,179 B2
(45) Date of Patent: Mar. 25, 2025

(54) TAPE, ZIPPER TAPE, TAPE-EQUIPPED CONTAINER, AND ZIPPER TAPE-EQUIPPED CONTAINER

(71) Applicant: IDEMITSU UNITECH CO., LTD., Tokyo (JP)

(72) Inventor: Hiroaki Yoshimura, Tokyo (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 0 days.

(21) Appl. No.: 17/760,998

(22) PCT Filed: Sep. 17, 2020

(86) PCT No.: PCT/JP2020/035186
§ 371 (c)(1),
(2) Date: Mar. 16, 2022

(87) PCT Pub. No.: WO2021/054384
PCT Pub. Date: Mar. 25, 2021

(65) Prior Publication Data
US 2022/0332472 A1    Oct. 20, 2022

(30) Foreign Application Priority Data
Sep. 20, 2019    (JP) .................. 2019-171138

(51) Int. Cl.
*B32B 27/32*    (2006.01)
*A44B 19/16*    (2006.01)
(Continued)

(52) U.S. Cl.
CPC .......... *B65D 33/2508* (2013.01); *A44B 19/16* (2013.01); *B32B 3/30* (2013.01);
(Continued)

(58) Field of Classification Search
CPC ............ B65D 33/24–259; B65D 75/58; B65D 75/5805; B65D 75/66; B65D 75/68;
(Continued)

(56) References Cited

U.S. PATENT DOCUMENTS

| | | | | |
|---|---|---|---|---|
| 4,816,316 A | * | 3/1989 | Robbins, III | B65D 1/42 428/167 |
| 5,664,303 A | * | 9/1997 | Johnson | B65D 33/2533 24/30.5 R |

(Continued)

FOREIGN PATENT DOCUMENTS

| | | |
|---|---|---|
| CN | 101522538 A | 9/2009 |
| CN | 102596740 A | 7/2012 |

(Continued)

OTHER PUBLICATIONS

Machine translation of JP 2000/309352 A.*
(Continued)

*Primary Examiner* — Z. Jim Yang
(74) *Attorney, Agent, or Firm* — MILLEN, WHITE, ZELANO & BRANIGAN, P.C.; Ryan R. Pool

(57) ABSTRACT

A tape having a cross sectional profile including first and second thick portions and a thin portion provided between the first and second thick portions is provided. The first and second thick portions and the thin portion are made of a resin composition whose main component is polyethylene. The density of at least a part of the thin portion is higher than a density of the first and second thick portions.

21 Claims, 13 Drawing Sheets

(51) Int. Cl.
    *B32B 3/30*        (2006.01)
    *B32B 7/05*        (2019.01)
    *B65D 33/25*     (2006.01)
    *B65D 75/58*     (2006.01)

(52) U.S. Cl.
    CPC ............... *B32B 7/05* (2019.01); *B32B 27/32* (2013.01); *B65D 75/5805* (2013.01); *Y10T 428/17* (2015.01)

(58) Field of Classification Search
    CPC .......... B65D 33/20–2508; B65D 33/28; B32B 27/32; B32B 27/327; B32B 3/26; B32B 3/263; B32B 3/30; Y10T 428/24479; Y10T 428/24408; Y10T 428/24521–24537; Y10T 428/2457; Y10T 428/24587; Y10T 428/24595; Y10T 428/24612
    See application file for complete search history.

(56) References Cited

U.S. PATENT DOCUMENTS

| | | | |
|---|---|---|---|
| 5,893,645 A * | 4/1999 | May | B65D 33/2516 |
| | | | 383/65 |
| 8,540,428 B2 | 9/2013 | Nanba et al. | |
| 2004/0013323 A1 * | 1/2004 | Withers | B65D 33/007 |
| | | | 383/65 |
| 2007/0015470 A1 | 1/2007 | Gotze et al. | |
| 2007/0028430 A1 * | 2/2007 | Ahn | B65D 33/2541 |
| | | | 24/399 |
| 2008/0310774 A1 * | 12/2008 | Turvey | B65D 33/2566 |
| | | | 383/100 |
| 2009/0252912 A1 * | 10/2009 | Yasuike | B32B 27/32 |
| | | | 428/41.3 |
| 2010/0074562 A1 * | 3/2010 | Nanba | B29C 65/02 |
| | | | 29/33 R |
| 2010/0236026 A1 * | 9/2010 | Nanba | B65D 33/2575 |
| | | | 24/30.5 L |
| 2010/0296756 A1 * | 11/2010 | Bois | B65D 33/2541 |
| | | | 383/64 |
| 2012/0207409 A1 * | 8/2012 | Katada | B65D 33/2533 |
| | | | 383/63 |
| 2012/0275730 A1 * | 11/2012 | Katada | B65D 33/2533 |
| | | | 24/400 |
| 2013/0094788 A1 * | 4/2013 | Wilcoxen | B65D 31/02 |
| | | | 428/167 |
| 2015/0183556 A1 * | 7/2015 | Shioda | B65D 33/2508 |
| | | | 24/30.5 L |
| 2015/0283029 A1 * | 10/2015 | Riis | B32B 15/20 |
| | | | 206/438 |
| 2015/0353238 A1 * | 12/2015 | Moehlenbrock | B65D 31/10 |
| | | | 493/267 |
| 2017/0008261 A1 * | 1/2017 | Jean-Mary | B32B 27/08 |
| 2017/0015470 A1 | 1/2017 | Tseng et al. | |
| 2018/0251268 A1 * | 9/2018 | Todaka | B65D 33/2583 |
| 2019/0177067 A1 * | 6/2019 | Ito | B65D 33/00 |
| 2020/0231341 A1 * | 7/2020 | Dais | B65D 33/007 |

FOREIGN PATENT DOCUMENTS

| | | | |
|---|---|---|---|
| CN | 102652097 A | | 8/2012 |
| DE | 10326810 A1 | | 1/2005 |
| JP | H1191044 A | | 4/1999 |
| JP | 2000309352 A | * | 11/2000 |
| JP | 2000326996 A | | 11/2000 |
| JP | 2004-244027 A | | 9/2004 |
| JP | 2004-276925 A | | 10/2004 |
| JP | 2011-167260 A | | 9/2011 |
| JP | 2012056612 A | * | 3/2012 |
| JP | 2013147288 A | * | 8/2013 |
| JP | 2016193081 A | * | 11/2016 |
| WO | 2008035494 A1 | | 3/2008 |

OTHER PUBLICATIONS

Machine translation of JP 2012/056612 A.*
Machine translation of JP 2013/147288 A.*
Machine translation of JP 2016/193081 A.*
Office Action in corresponding CN 202080064976.9 dated Apr. 7, 2023 (pp. 1-8).
English translation of International Search Report for PCT/JP2020/035186 dated Dec. 1, 2020.
English Machine Translation of JP2011167260, Publication Date: Sep. 1, 2011.
English Machine Translation of JP2004276925, Publication Date: Oct. 7, 2004.
English Machine Translation of JP2004244027, Publication Date: Sep. 2, 2004.

* cited by examiner

TAPE, ZIPPER TAPE, TAPE-EQUIPPED CONTAINER, AND ZIPPER TAPE-EQUIPPED CONTAINER

TECHNICAL FIELD

The present invention relates to a tape, a zipper tape, a tape-attached container, and a zipper-tape container.

BACKGROUND ART

As packaging materials for packaging various articles such as food, drug, medical products, and groceries, there are used zipper-tape packaging bags in which an opening of the bag is provided with a pair of band-shaped zipper tapes each provided with corresponding one of a male member and a female member that are reclosably mated. Such a zipper-tape packaging bag, which is hermetically closed by sealing an upper part of the zipper tape, is openable by tearing a film of the bag body from a start position (e.g. one of notches provided on both sides of the packaging bag).

When the zipper-tape packaging bag is thus opened, the film near the zipper tape is sometimes torn, making it difficult to hold the bag body. Accordingly, there is a growing demand for a technique for cutting the film of the bag body at a desired position. Patent Literature 1 discloses a technique in which an opening string is provided at a part of the zipper tape and the opening string is pulled to tear the film of the bag body. Further, Patent Literature 2 discloses a zipper tape configured to be cut with a use of a tearable resin that serves as a guide for tearing the zipper tape.

As an improvement of the techniques disclosed in the above Patent Literatures 1 and 2, Patent Literature 3 discloses a zipper tape attached to an inner surface of a back body of a packaging bag. The zipper tape includes a first convex portion thicker than the body, a thin portion adjacent to the first convex portion, and a second convex portion adjacent to the thin portion and thicker than the thin portion and the body, in which the thin portion serving as a guide for tearing the bag body. According to this technique, an opening can be easily formed by tearing the bag body along the thin portion.

CITATION LIST

Patent Literature(s)

Patent Literature 1 JP 2004-276925 A
Patent Literature 2 JP 2004-244027 A
Patent Literature 3 WO 2008/035494 A

SUMMARY OF THE INVENTION

Problems to be Solved by the Invention

It should be noted that "mono-material production," in which all or at least not less than a predetermined ratio of the material of plastic products is provided by a single compound, has recently been popular in order to enhance recyclability of plastic products. The use of a mono-material in a form of a resin composition whose main component is polyethylene is also studied in producing the above tape having the thin portion to be used for forming an opening in the bag body. However, due to the inherent properties of polyethylene, the thin portion is sometimes stretched instead of being ruptured when the bag body is torn, resulting in unfavorable appearance after being opened and/or causing difficulty in forming an opening.

In view of the above, an object of the invention is to provide a tape and a zipper tape provided with a thin portion and made of a resin composition whose main component is polyethylene, and a tape, a zipper tape, a tape-attached container, and a zipper-tape container allowing the tape or the zipper tape to be smoothly torn along the thin portion in a container attached with the tape or the zipper tape.

Means for Solving the Problem(s)

[1] A tape having a cross sectional profile including a first thick portion, a second thick portion, and a thin portion provided between the first and second thick portions, in which the first and second thick portions and the thin portion are made of a resin composition whose main component is polyethylene, and a density of at least a part of the thin portion is higher than a density of the first thick portion and a density of the second thick portion.

[2] The tape according to [1], in which the density of the at least a part of the thin portion is in a range from 930 $kg/m^3$ to 970 $kg/m^3$.

[3] The tape according to [1] or [2], in which a density of at least a part of the first and second thick portions is in a range from 900 $kg/m^3$ to 930 $kg/m^3$.

[4] The tape according to any one of [1] to [3], in which the tape has a tearing resistance of 4 N or less.

[5] The tape according to any one of [1] to [4], in which the tape has a tearing resistance range of less than 3.3 N.

[6] The tape according to any one of [1] to [5], in which at least one of the first thick portion, the second thick portion, or the thin portion is made of a resin composition containing bio-polyethylene.

[7] The tape according to any one of [1] to [6], in which the cross sectional profile includes a first portion and a second portion configured to at least partially face each other, and at least one of the first portion or the second portion includes the first and second thick portions and the thin portion in a cross sectional profile thereof.

[8] A zipper tape including a first portion and a second portion in a cross sectional profile thereof, the first and second portions being configured to at least partially face each other, each of the first and second portions includes in a cross sectional profile thereof a base strip and an engagement portion protruding from the base strip, the engagement portion of the first portion and the engagement portion of the second portion being engageable with each other, the cross sectional profile of at least one of the first portion or the second portion includes a first thick portion continuous with the base strip, a second thick portion, and a thin portion provided between the first and second thick portions, the engagement portion, the base strip, the first and second thick portions, and the thin portion are made of a resin composition whose main component is polyethylene, and a density of at least a part of the thin portion is higher than a density of the first thick portion and a density of the second thick portion.

[9] The zipper tape according to [8], in which the first thick portion is thicker than the base strip.

[10] The zipper tape according to [8] or [9], in which the density of the at least a part of the thin portion is in a range from 930 $kg/m^3$ to 970 $kg/m^3$.

[11] The zipper tape according to any one of [8] to [10], in which a density of at least a part of the first and second thick portions is in a range from 900 kg/m³ to 930 kg/m³.

[12] The zipper tape according to any one of [8] to [11], in which the zipper tape has a tearing resistance of 4 N or less.

[13] The zipper tape according to any one of [8] to [12], in which the zipper tape has a tearing resistance range of less than 3.3 N.

[14] The zipper tape according to any one of [8] to [13], in which at least one of the engagement portion, the base strip, the first thick portion, the second thick portion, or the thin portion is made of a resin composition containing bio-polyethylene.

[15] A tape-attached container including: a container body at least including a first area and a second area that face each other, and the tape according to [7] or the zipper tape according to any one of [8] to [14], at least a part of the first portion of the tape or the zipper tape being bonded to the first area and at least a part of the second portion of the tape or the zipper tape being bonded to the second area.

[16] The tape-attached container according to [15], in which the container body is bag-shaped.

[17] The tape-attached container according to [15] or [16], in which the thin portion is provided with a rib extending in a longitudinal direction or the tape or the zipper tape and protruding in a thickness direction of the tape or the zipper tape, and, a top of the rib is bonded to the first area or the second area.

[18] The tape-attached container according to any one of [15] to [17], in which a seal portion adjacent to an outer periphery of the container body is provided to an end of the tape or the zipper tape in the longitudinal direction, the first and second portions and the first and second areas being thermally fused at the seal portion, and a thin seal portion that traverses the seal portion along the longitudinal direction of the tape or the zipper tape is provided.

According to the above aspects of the invention, the density of at least a part of the thin portion is higher than the density of the first and second thick portions, reducing the ductility of polyethylene which is the main component of the resin composition. The tape or the zipper tape can thus be smoothly torn along the thin portion.

DESCRIPTION OF EMBODIMENT(S)

Figure 1:
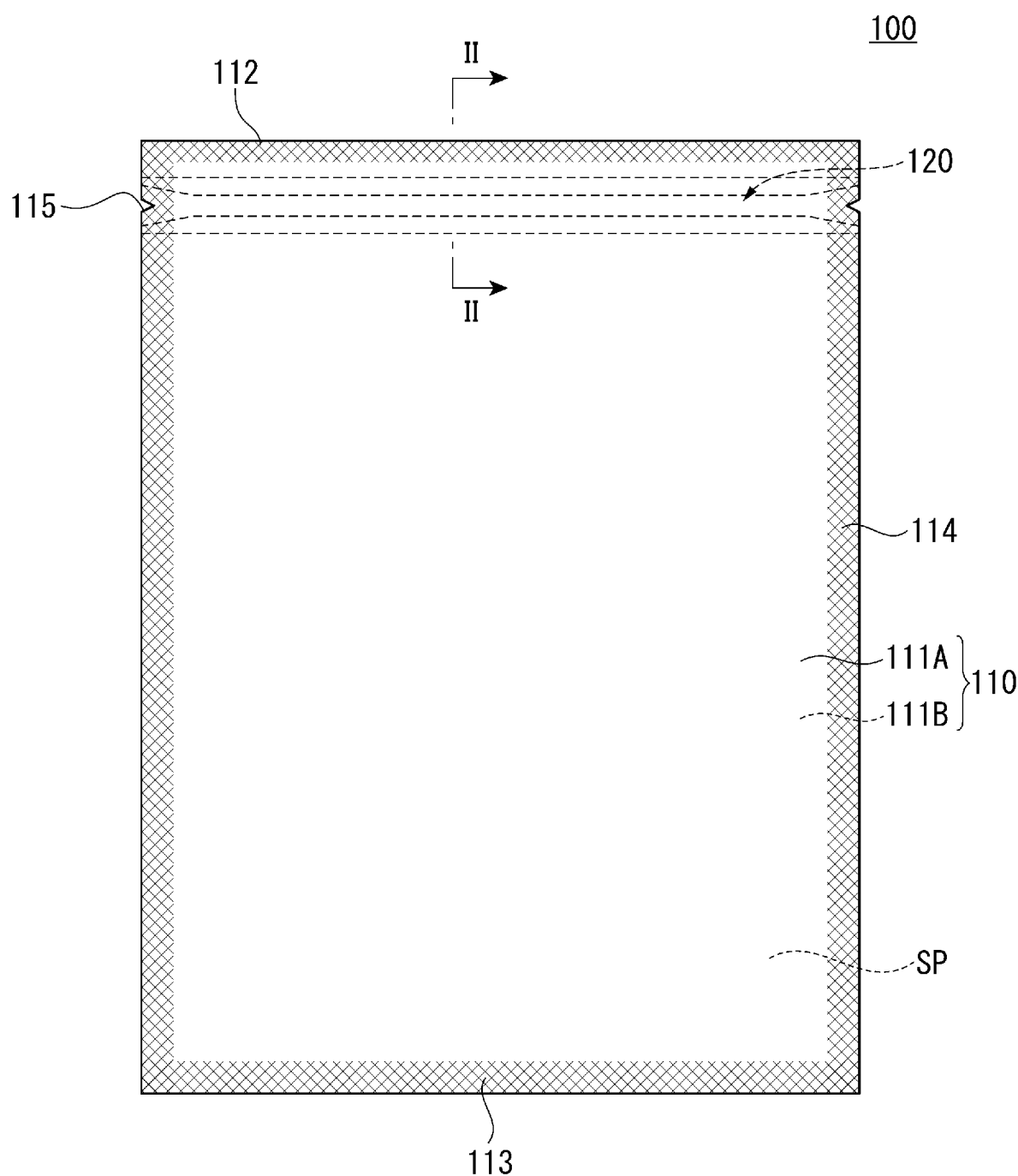
FIG. 1 is a plan view of a tape-attached bag according to a first exemplary embodiment of the invention.

Suitable exemplary embodiments of the invention will be described in detail below with reference to the attached drawings. It should be noted that components of the same or substantially the same function(s) and structure(s) will be denoted by the same reference numerals herein and in the drawings, omitting repetition of description thereof.

First Exemplary Embodiment

Figure 2:
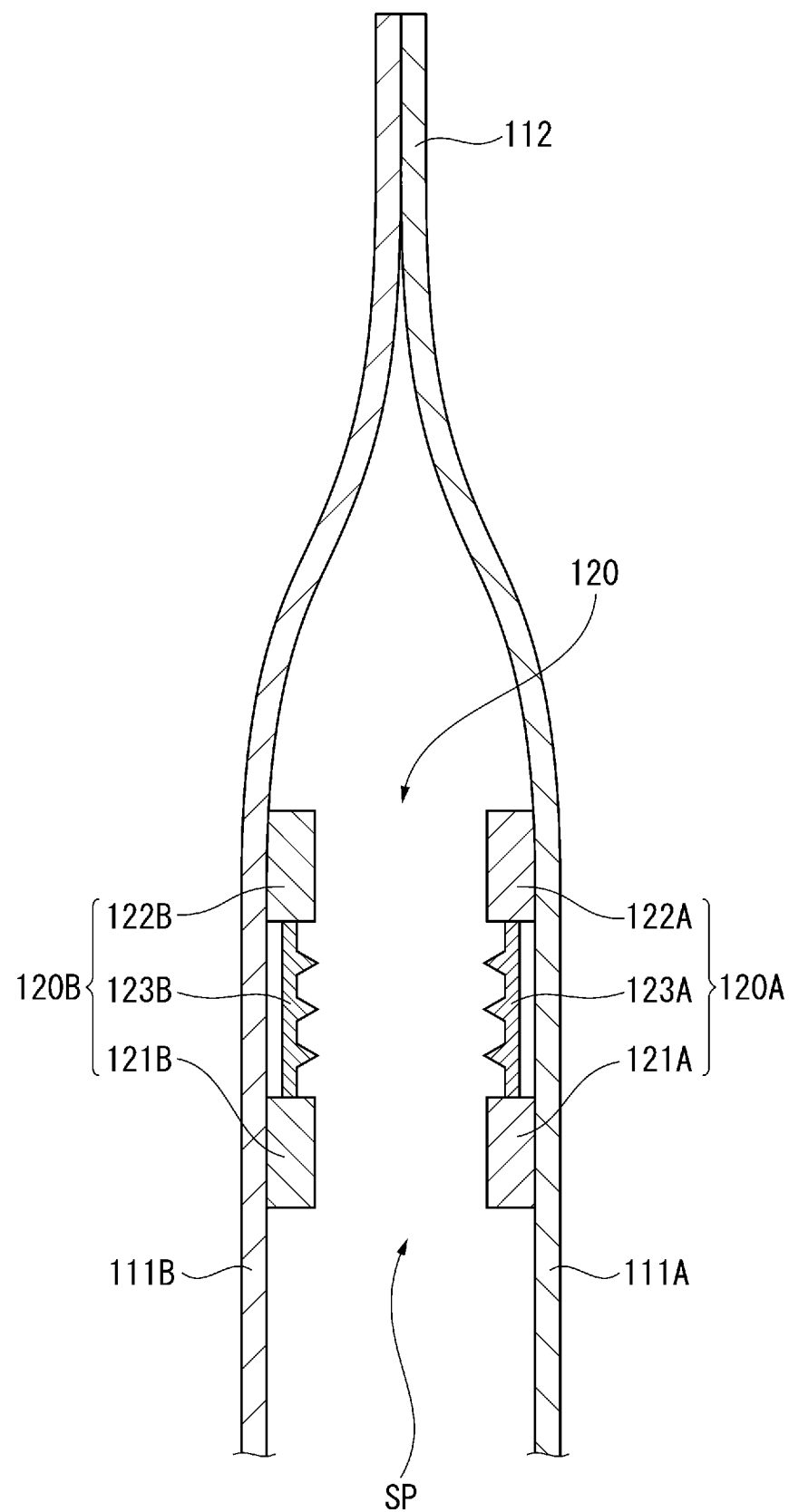
FIG. 2 is a cross sectional view taken along II-II lines in FIG. 1.

FIG. 1 is a plan view of a tape-attached bag according to a first exemplary embodiment of the invention. FIG. 2 is a cross sectional view taken along II-II lines in FIG. 1. As illustrated, a tape-attached bag 100 includes a bag body 110 made of a film and having mutually facing first area 111A and second area 111B, and a tape 120 bonded to the first area 111A and the second area 111B of the bag body 110 to define a side of a containing space SP formed between the first area 111A and the second area 111B.

The bag body 110 is made of, for instance, a single- or multi-layered thermoplastic resin film. Specific examples of the thermoplastic resin include low-density polyethylene (LDPE), linear low-density polyethylene (LLDPE), and polypropylene (PP). PP is optionally homo polypropylene (HPP), random polypropylene (RPP), or block polypropylene (BPP). When the bag body 110 is made of a multi-layered film, a top base material is optionally biaxially oriented polypropylene (OPP), biaxially oriented polyethylene terephthalate (OPET), or biaxially oriented nylon (ONy). These resins are not necessarily derived from fossil fuel. For instance, these resins are optionally eco-friendly bioplastic or a mixture of a fossil-fuel-derived resin and bioplastic. The bioplastic is preferably, for instance, bio-polyethylene. The film forming the bag body 110 optionally includes a layer of metal material (e.g. aluminum) and/or a layer of an inorganic material. When the bag body 110 is made of a mono-material in a form of a resin composition whose main component is polyethylene in the same manner as the tape 120 described later, a highly recyclable and eco-conscious arrangement is available. Further, the use of bio-polyethylene in a form of polyethylene allows more highly recyclable and eco-conscious arrangement.

Although the bag body 110 is formed by mutually bonding two films at a top seal portion 112, a bottom seal portion 113 and side seal portions 114 in the present exemplary embodiment, the bag body 110 is optionally formed by folding a single film at a part corresponding to one of the side seal portions 114 in some embodiments. Additionally or alternatively, the film is optionally interfolded at a part(s) corresponding to the bottom seal portion 113 and/or the side seal portions 114 to form a so-called gusset. In this case, the gusset is optionally formed by the same film(s) as the first area 111A or the second area 111B or by a film independent of the film(s). The tape-attached bag 100 is optionally a stand up pouch capable of standing upright on the gusset formed at a bottom thereof.

As shown in FIG. 2, the tape 120 is an elongated component having mutually facing first portion 120A and second portion 120B in a cross sectional profile thereof. The first portion 120A and the second portion 120B respectively include, in cross sectional profiles thereof, first thick portions 121A, 121B, second thick portions 122A, 122B, and thin portions 123A, 123B. The first thick portions 121A, 121B and the second thick portions 122A, 122B are not necessarily of the same thickness. However, the thin portions 123A, 123B are thinner than both of the first thick portions 121A, 121B and the second thick portions 122A, 122B. It should be noted that the thin portions 123A, 123B are not necessarily of the same thickness. For instance, as in the illustrated example, ribs extending in a longitudinal direction of the tape 120 and protruding in a thickness direction are optionally provided on one side (inner side of the bag body 110) of each of the thin portions 123A, 123B. The first portion 120A is bonded to the first area 111A of the bag body 110 at the first thick portion 121A and the second thick portion 122A. The second portion 120B is similarly bonded to the second area 111B of the bag body 110 at the first thick portion 121B and the second thick portion 122B.

In the present exemplary embodiment, the tape 120 is made of a mono-material in a form of the resin composition whose main component is polyethylene. In other words, an entirety of the tape 120 (i.e. the first thick portions 121A, 121B, the second thick portions 122A, 122B, and the thin portions 123A, 123B) is made of the resin composition whose main component is polyethylene. The main component herein refers to a component accounting for not less than a predetermined ratio of the resin composition. Specifically, the main component is typically a component whose content is 50 mass % or more, preferably a component whose content is 70 mass % or more, more preferably a component whose content is 90 mass % or more, further preferably a component whose content is 95 mass % or more, especially preferably a component whose content is 98 mass % or more, most preferably a component whose content is 100 mass %. It should however be noted that the presence of an additive(s) and/or impurities is acceptable even when the content of the main component is 100%. The main component is measurable by, for instance, an infrared method (IR method). Polyethylene, which is the main component of the resin composition forming the tape 120, is optionally bio-polyethylene in a form of a plant-based resin or a mixture of fossil-fuel-based polyethylene resin and bio-polyethylene in a form of a plant-based resin, without being limited to fossil-fuel-based polyethylene resin. Forming the tape 120 from a mono-material in a form of the resin composition whose main component is polyethylene results in a highly recyclable and eco-conscious arrangement. The use of bio-polyethylene in a form of polyethylene further allows a more highly recyclable and eco-conscious arrangement.

Further, in the present exemplary embodiment, the density of the thin portions 123A, 123B (sometimes simply referred to as "thin-portion density" hereinafter) of the tape 120 is higher than the density of the first thick portions 121A, 121B and the second thick portions 122A, 122B (sometimes simply referred to as "thick-portion density" hereinafter). Preferably, the thin-portion density is in a range from 930 kg/m$^3$ to 970 kg/m$^3$ and the thick-portion density is in a range from 900 kg/m$^3$ to 930 kg/m$^3$. More preferably, the thin-portion density is in a range from 940 kg/m$^3$ to 970 kg/m$^3$ and the thick-portion density is in a range from 905 kg/m$^3$ to 925 kg/m$^3$. Further preferably, the thin-portion density is in a range from 950 kg/m$^3$ to 970 kg/m$^3$ and the thick-portion density is in a range from 910 kg/m$^3$ to 925 kg/m$^3$. The density can be measured according to JIS K 7112:1999. It should be noted that, at a density of the thick portion of 930 kg/m$^3$ or less, the thick portion can be easily flattened after bonding the tape 120 to the bag body 110 and the number of pinholes can be minimized.

With the above-described difference in densities, the ductility of polyethylene (the main component of the resin composition) is relatively weakened in the thin portions 123A, 123B, thus reducing the stretch of the thin portions before being stress-ruptured. Accordingly, when, for instance, a user is going to tear the bag body 110 from a notch 115 formed in one of the side seal portions 114 at an end of the tape 120 in the longitudinal direction, the thin portions 123A, 123B, at which the stress concentrates, is ruptured at an early stage of stretch of the thin portions. By rupturing the tape 120 at the thin portions 123A, 123B, the first area 111A and the second area 111B of the bag body 110, which are respectively bonded to the first thick portions 121A, 121B and the second thick portions 122A, 122B at both sides of the thin portions 123A, 123B, are torn to form an opening in the bag body 110.

In the present exemplary embodiment, the width of the thin portions 123A, 123B (i.e. dimension in a width direction of the tape 120) is typically 1 mm or more, preferably 2 mm or more. By enlarging the width of the thin portions, the tolerable range of the offset in the notch 115 in the width direction of the tape 120 is widened, thereby improving the production efficiency. The upper limit of the width of the thin portions, which is not particularly limited, is typically 5 mm, preferably 4 mm or less, because the larger width of the thin portions results in consumption of larger amount of the film material not forming the containing space SP. Further, the thickness of the thin portions 123A, 123B is typically in a range from 10 μm to 120 μm, preferably in a range from 20 μm to 100 μm, more preferably in a range from 30 μm to 80 μm. When the thickness of the thin portions exceeds 120 μm, the thin portions are possibly difficult to be torn in opening the bag. In contrast, when the thickness of the thin portions is less than 10 μm, the difference from the thickness of the thick portions possibly becomes too large to keep the shape of the tape 120, thereby, for instance, deteriorating the production efficiency. The thickness of the first thick portions 121A, 121B and the second thick portions 122A, 122B is typically 150 μm or more, preferably 200 μm or more, further preferably 250 μm or more. The upper limit, which is not particularly limited, is 700 μm in view of the convenience for flattening during the production process.

As described above, in the present exemplary embodiment, even when the tape 120 is made of a mono-material in a form of the resin composition whose main component is polyethylene, the tape 120 can be easily torn along the thin portions 123A, 123B, so that an opening can be easily formed in the bag body 110 with the tape 120.

Figure 3:
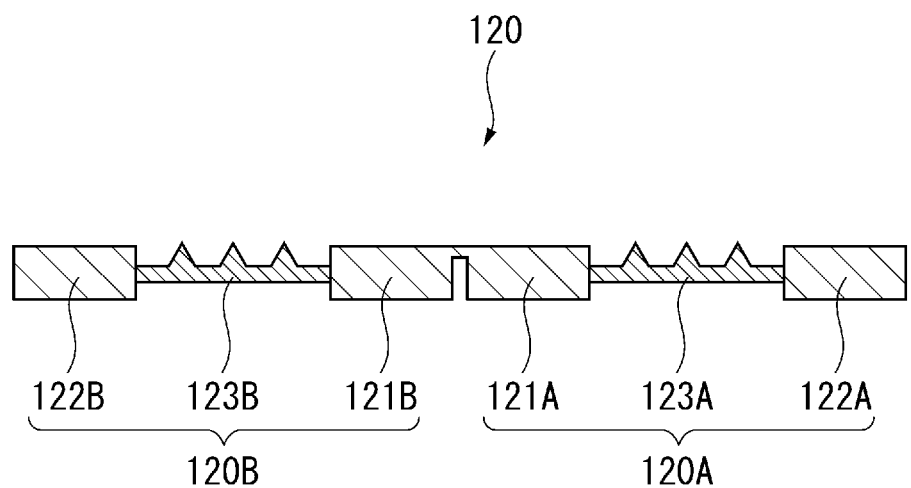
FIG. 3 is a cross sectional view showing an example of a tape according to the first exemplary embodiment of the invention.

FIG. 3 is a cross sectional view showing an example of the tape according to the first exemplary embodiment of the invention. The tape 120, which is attached to the bag body 110 in the example described with reference to FIGS. 1 and 2, is separately provided before being attached to the bag body 110. In this case, as illustrated, the first portion 120A and the second portion 120B are optionally integrally provided, for instance, with the first thick portions 121A, 121B being connected. In this arrangement, the first portion 120A and the second portion 120B of the tape 120 can be positioned to face each other by cutting or bending the connected part. In other words, the tape 120 according to the present exemplary embodiment is not necessarily arranged so that the first portion 120A and the second portion 120B face each other when the tape 120 is supplied, but is arranged in any manner as long as the first portion 120A and the second portion 120B can be positioned to face each other.

Figure 4:
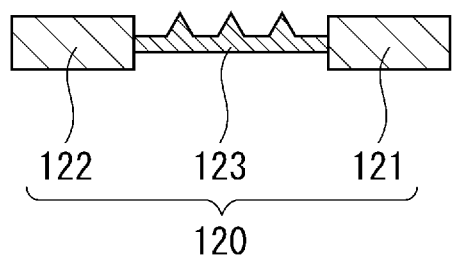
FIG. 4 is a cross sectional view showing another example of the tape according to the first exemplary embodiment of the invention.

FIG. 4 is a cross sectional view showing another example of the tape according to the first exemplary embodiment of the invention. In the above example described with reference to FIGS. 1 and 2, the first portion 120A and the second portion 120B of the tape 120 have the substantially same cross sectional profile. Accordingly, as shown in FIG. 4, the tape 120 including the first thick portion 121, the second thick portion 122, and the thin portion 123 in the cross sectional profile is optionally supplied and the tape 120 is optionally used as the above-described first portion 120A and the second portion 120B.

Figure 5:
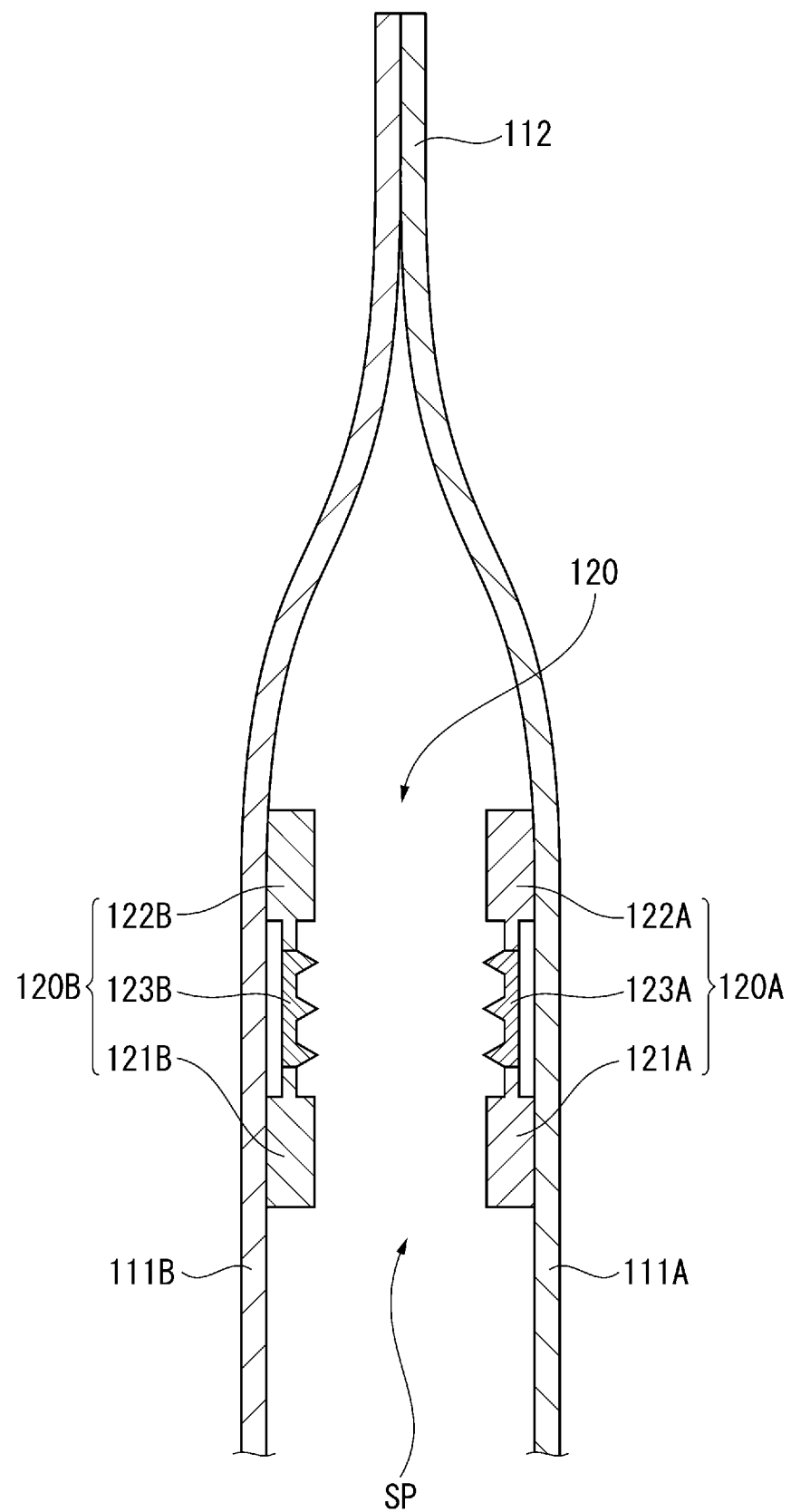
FIG. 5 is a cross sectional view showing still another example of the tape-attached bag according to the first exemplary embodiment of the invention.
Figure 6:
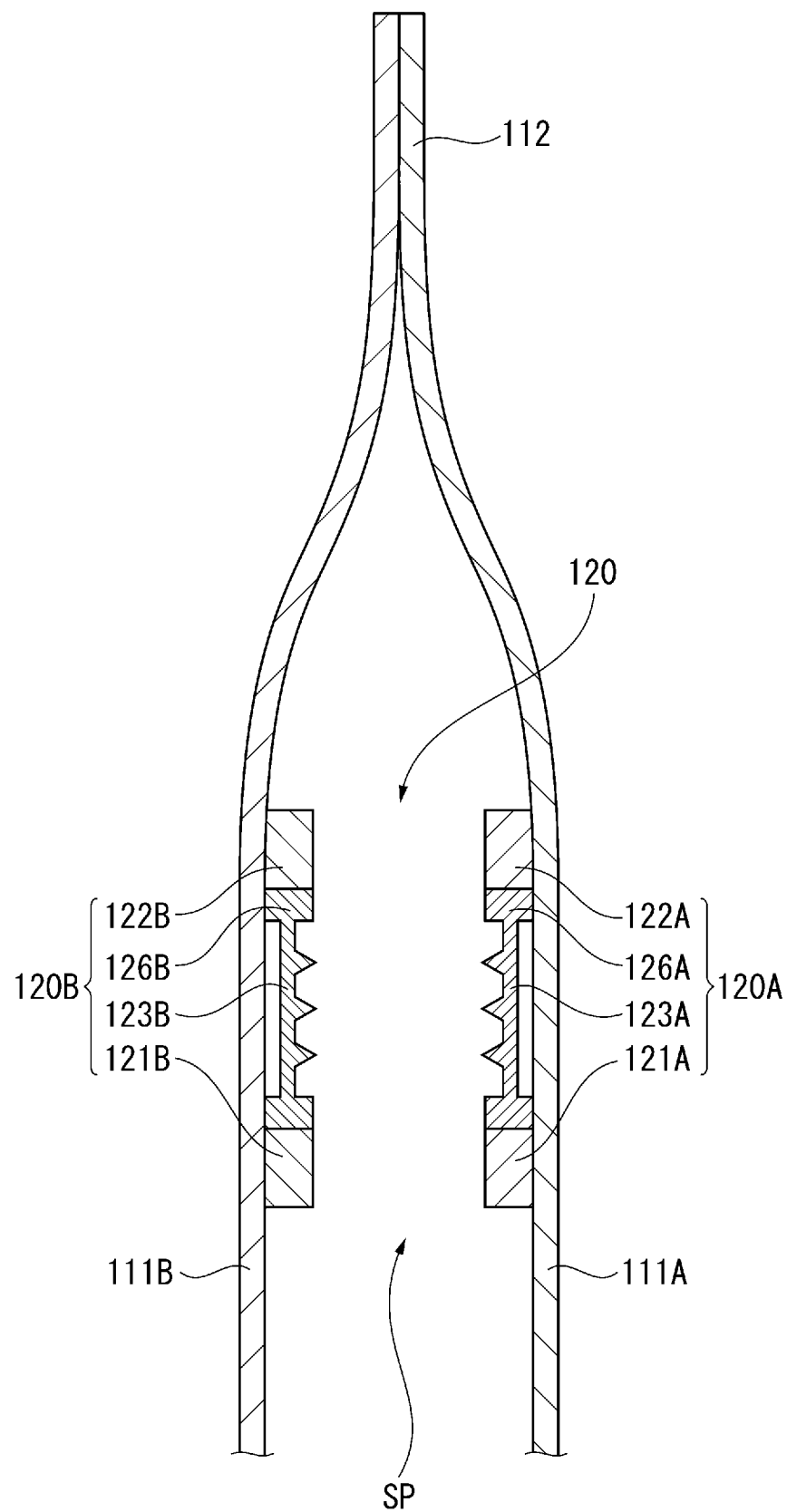
FIG. 6 is a cross sectional view showing a further example of the tape-attached bag according to the first exemplary embodiment of the invention.

FIGS. 5 and 6 are cross sectional views showing other examples of the tape-attached bag according to the first exemplary embodiment of the invention. In the example shown in FIG. 5, portions with relatively high density (sometimes referred to as "high-density portion" hereinafter) of the first portion 120A and the second portion 120B of the tape 120, which is made of the resin composition whose main component is polyethylene, are respectively a part of the thin portion 123A and a part of the thin portion 123B. In this arrangement, the high-density portion in the thin portions 123A, 123B is easily ruptured, thus easily forming an opening in the tape-attached bag 100.

In the example shown in FIG. 6, the high-density portion includes the entirety of the thin portions 123A, 123B and high-density portions 126A, 126B are formed between the thin portions 123A, 123B and the first and second thick portions 121A, 121B, 122A, 122B. The thickness of the high-density portions 126A, 126B is the same as the thicknesses of the first thick portions 121A, 121B or the second thick portions 122A, 122B. The high-density portions 126A, 126B, whose ductility is relatively low like the thin portions 123A, 123B, are easily ruptured. However, since the stress concentrates at the thin portions 123A, 123B when the force for tearing the bag body 110 is applied, the tape 120 is ruptured at the thin portions 123A, 123B as in the above example shown in FIG. 2, allowing easy formation of an opening in the bag body 110.

Figure 7:
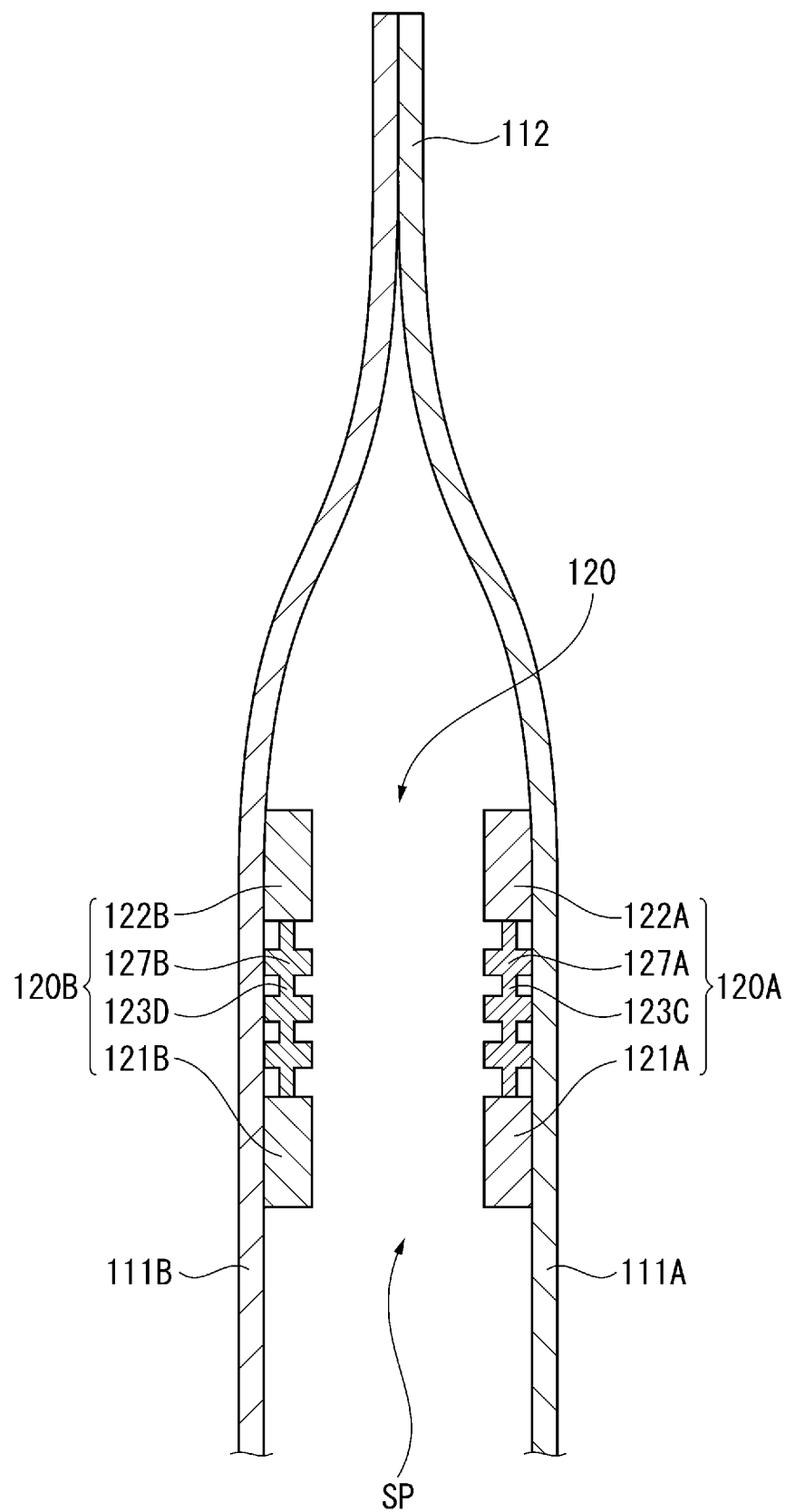
FIG. 7 is a cross sectional view showing a still further example of the tape-attached bag according to the first exemplary embodiment of the invention.

FIG. 7 is a cross sectional view showing a further example of the tape-attached bag according to the first exemplary embodiment of the invention. In the example shown in FIG. 7, ribs 127A, 127B extending in the longitudinal direction of the tape 120 are formed on the thin portions 123C, 123D, respectively. Unlike the example shown in FIG. 2, the ribs 127A, 127B protrude from the thin portions 123C, 123D in both thickness directions (i.e. protruding toward the first area 111A and the second area 111B and protruding inward the bag body 110). The top of the rib 127A protruding from the thin portion 123C of the first portion 120A is bonded to the first area 111A and the top of the rib 127B protruding from the thin portion 123D of the second portion 120B is bonded to the second area 111B. The ribs 127A, 127B thus formed linearly guide a rupture line along the ribs 127A, 127B in the thin portions 123C, 123D when force for tearing the bag body 110 is applied. With the above arrangement, the bag body 110 can be easily torn. Further, the shape of the opening formed after the bag body is torn becomes linear, thereby enhancing usability.

Figure 8:
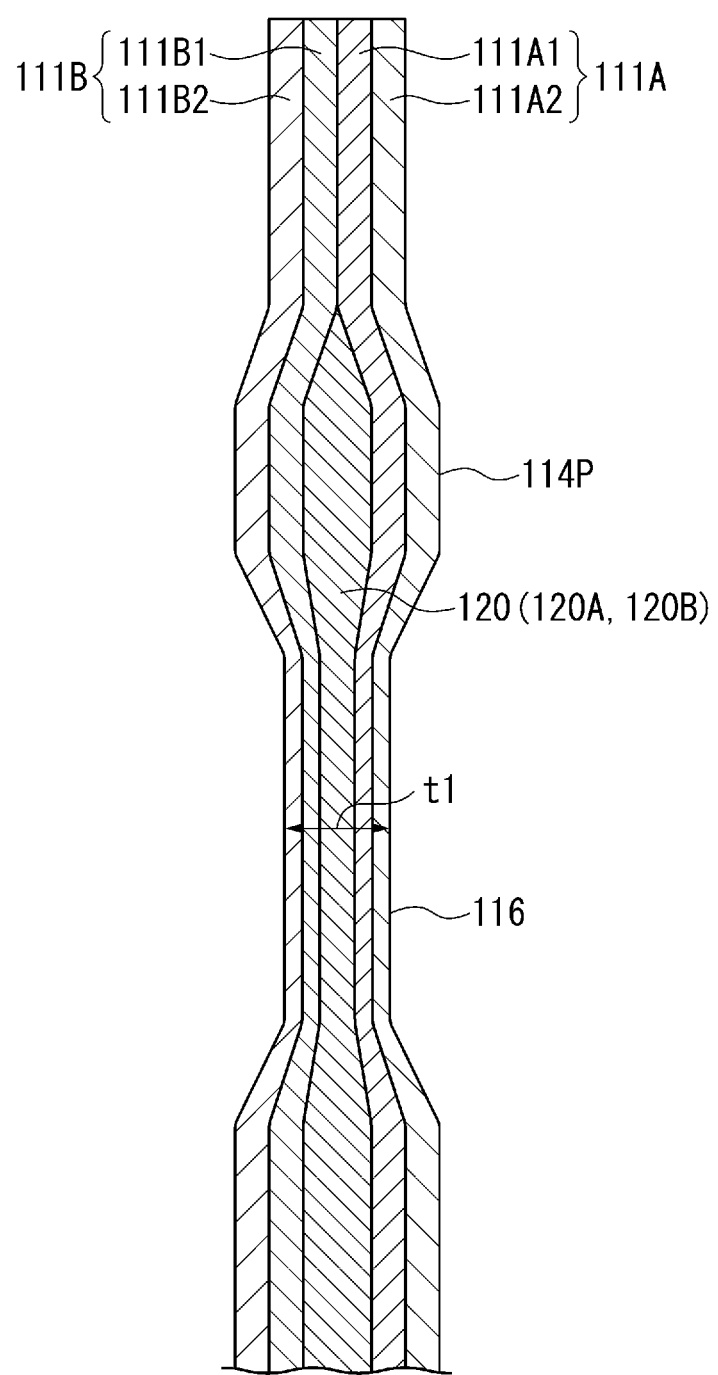
FIG. 8 is an illustration showing an example of an arrangement of a side seal portion of the tape-attached bag according to the first exemplary embodiment of the invention.
Figure 9:
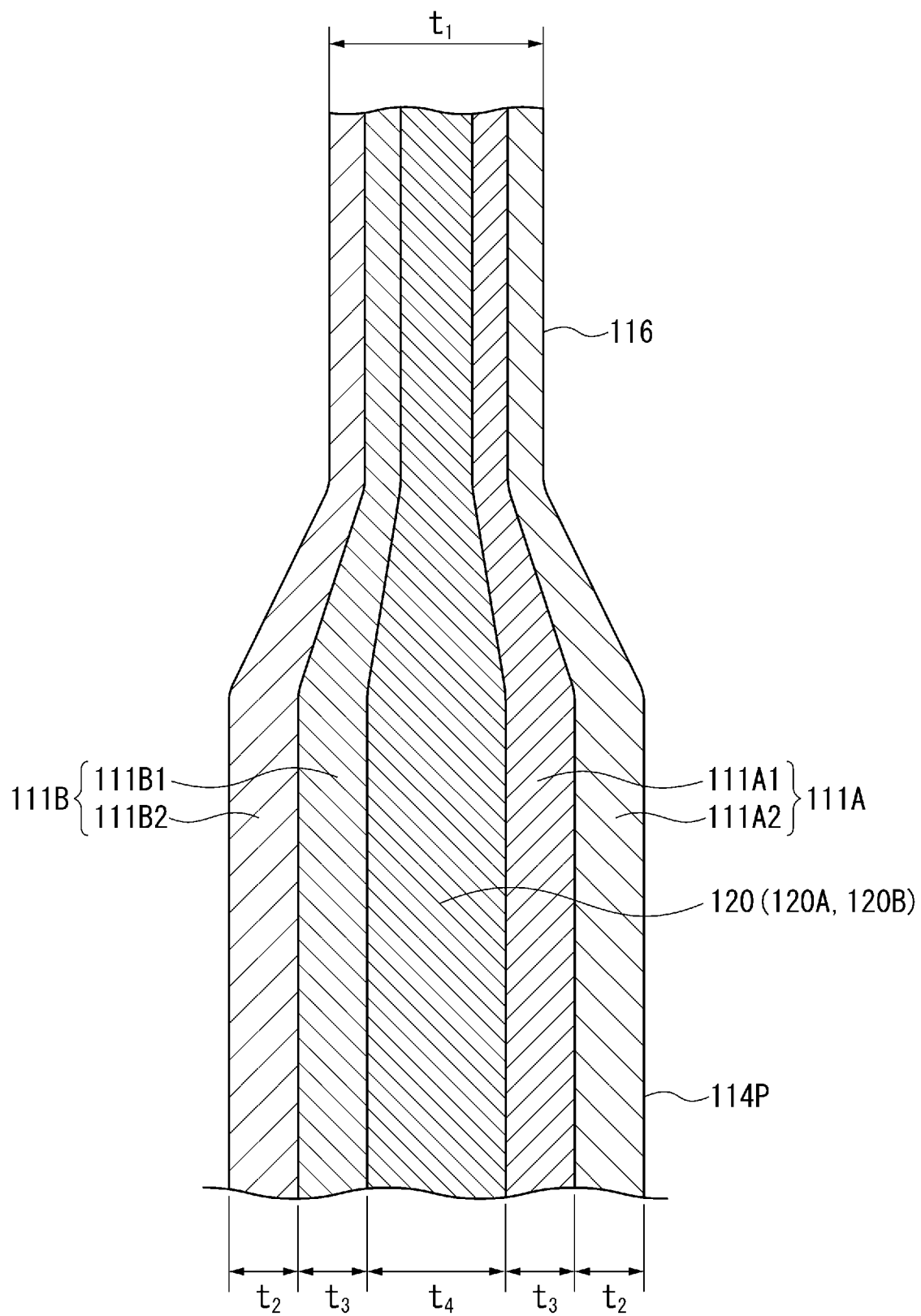
FIG. 9 is an enlarged view of FIG. 8.

FIG. 8 shows an example of an arrangement of a side seal portion of the tape-attached bag according to the first exemplary embodiment of the invention. FIG. 9 is an enlarged view of FIG. 8. In the example shown in FIG. 8, a point seal portion 114P, at which the tape 120 (the first portion 120A and the second portion 120B) and the first area 111A and the second area 111B of the bag body 110 are thermally fused, is formed at a longitudinal end of the tape 120 adjacent to an outer periphery of the bag body 110. The point seal portion 114P is a part of the side seal portion 114. A thin seal portion 116, which traverses the point seal portion 114P along the longitudinal direction of the tape 120, is provided at or near the center of the point seal portion 114P. The thickness of the thin seal portion 116 is smaller than that of any other part of the point seal portion 114P. Specifically, for instance, as shown in FIGS. 8 and 9, assuming that the thickness of the thin seal portion 116 is $t_1$, the thickness of each of top base material layers 111A2, 111B2 of the first area 111A and the second area 111B of the bag body 110 is $t_2$, the thickness of each of sealant layers 111A1, 111B1 is $t_3$, and the thickness of the fused tape 120 is $t_4$, $t_1$ is twice or more of $t_2$ and is smaller than twice the sum of $t_2$, $t_3$, and to $(2t_2 \leq t_1 \leq 2(t_2+t_3+t_4))$. The thin seal portion 116 is formed, for instance, by cooling the heated portion after forming the point seal portion 114P, and then heat-pressing the portion corresponding to the thin seal portion 116.

In the above example described with reference to FIGS. 8 and 9, a resin aggregated portion, which is typically formed in the side seal portion 114, is not formed in the thin seal portion 116. Accordingly, for instance, the resistance in tearing the bag body 110 from the notch 115 is small, so that the tape-attached bag 100 can be easily opened.

It should be noted that the resistance in tearing the bag (tearing resistance) is measurable through a trouser tear test (JIS K7128-1). A bag can be easily opened when, for instance, the tearing resistance of the tape 120 is 4 N or less, and can be more easily opened when the tearing resistance of the tape 120 is 3 N or less. The tearing resistance is preferably 2 N or less, more preferably 1 N or less. The lower limit of the tearing resistance, which is preferably as low as possible, is typically about 0.1 N. The tearing resistance is measurable by a method described in Examples. A tearing resistance range, which is an index for the stretch of the tape 120 when being torn, is, for instance, less than 3.3 N, preferably 2.2 N or less, more preferably 1.2 N or less, further preferably 0.5 N or less, especially preferably 0.3 N or less. The lower limit of the tearing resistance range, which is not specifically limited, is typically 0 N. Appearance is likely to become more favorable with smaller stretch when being torn. The tearing resistance range is also measurable by the trouser tear test according to the method described in Examples.

Second Exemplary Embodiment

Figure 10:
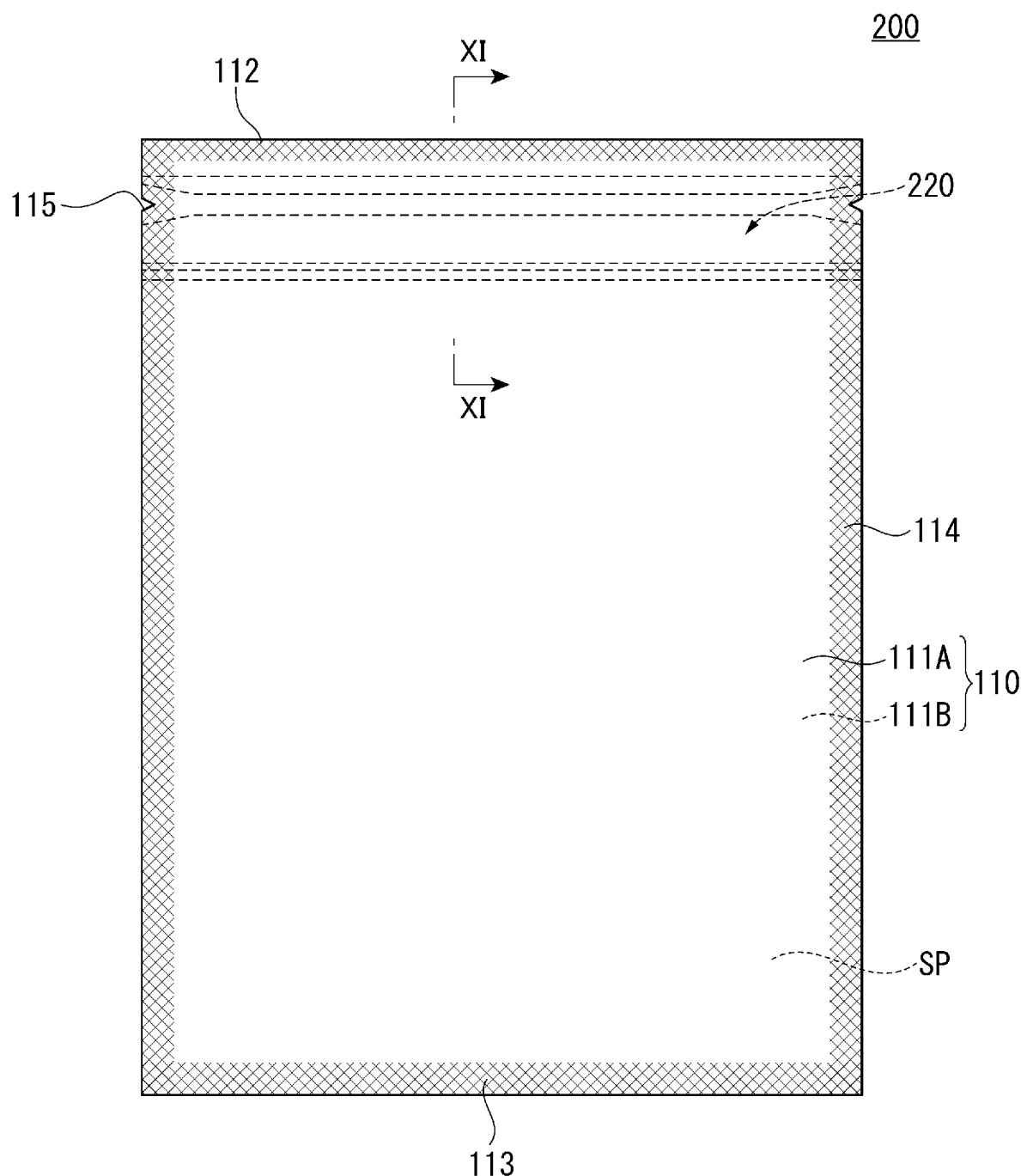
FIG. 10 is a plan view of a zipper-tape bag according to a second exemplary embodiment of the invention.
Figure 11:
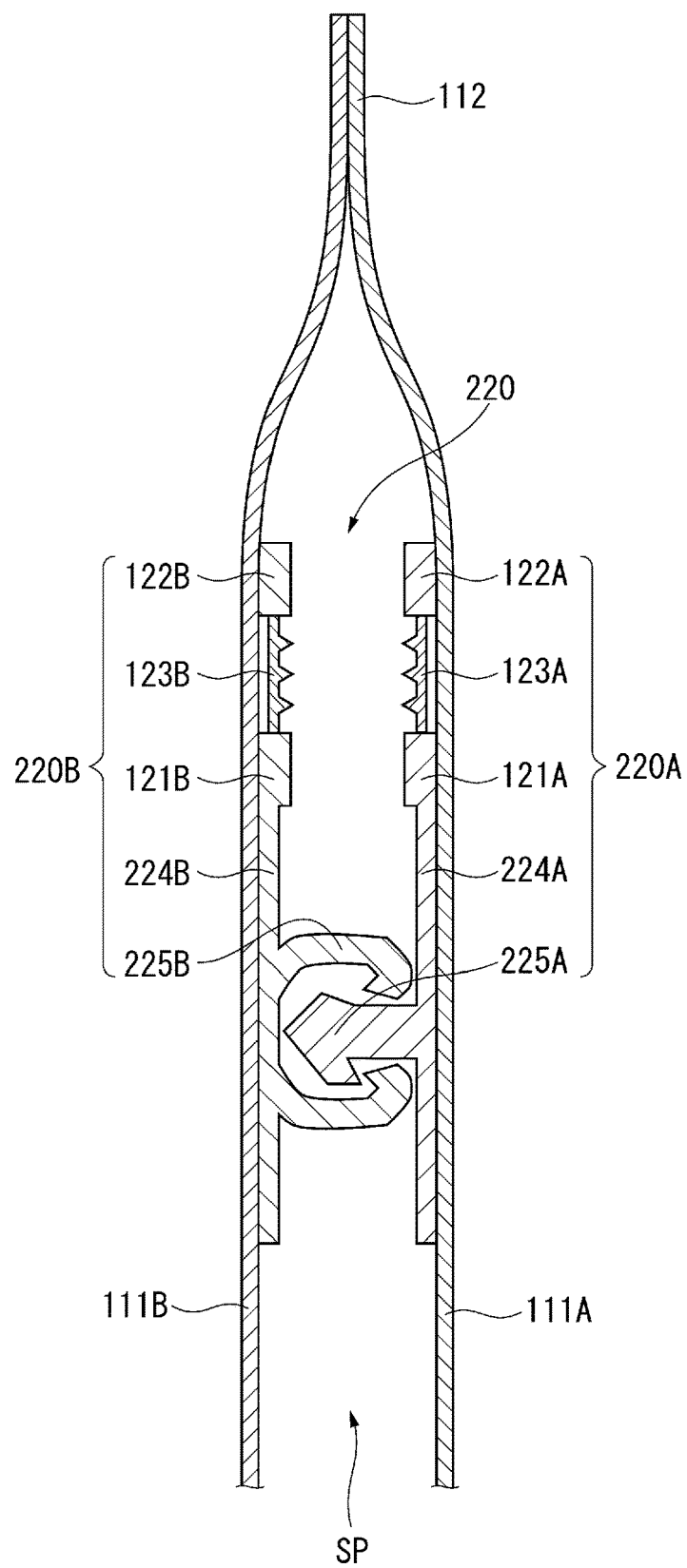
FIG. 11 is a cross sectional view taken along XI-XI lines in FIG. 10.

FIG. 10 is a plan view of a zipper-tape bag according to a second exemplary embodiment of the invention. FIG. 11 is a cross sectional view of FIG. 10 taken along XI-XI lines. As illustrated, a zipper-tape bag 200 includes the bag body 110 similar to the bag body 110 of the above-described first exemplary embodiment and a zipper tape 220 bonded to the first area 111A and the second area 111B of the bag body 110 to define a side of the containing space SP formed between the first area 111A and the second area 111B.

As shown in FIG. 11, the tape 220 is an elongated component having mutually facing first portion 220A and second portion 220B in a cross sectional profile thereof. The first portion 220A and the second portion 220B respectively include, in cross sectional profiles thereof, first thick portions 121A, 121B, second thick portions 122A, 122B, and thin portions 123A, 123B, which are the same as those in the first exemplary embodiment, and base strips 224A, 224B and engagement portions 225A, 225B forming a zipper portion. The base strips 224A, 224B are bonded respectively to the first area 111A and the second area 111B of the bag body 110 to face each other. The engagement portions 225A, 225B protrude from the base strips 224A, 224B, respectively, to be engageable with each other.

In the present exemplary embodiment, the first thick portions 121A, 121B are continuous with the base strips 224A, 224B, respectively. The first thick portions 121A, 121B are thicker than the base strips 224A, 224B. It should be noted that the engagement portions 225A, 225B are not necessarily shaped as illustrated but are optionally shaped as in engagement portions of known various zippers (e.g. a combination of claw-shape, hook-shape, and knob-shape). The engagement portion 225A and the engagement portion 225B, which are respectively male-shaped and female-shaped in the illustrated example, are optionally vice versa. Further, although a pair of engagement portions is provided in the illustrated example, pairs of engagement portions are optionally provided. An entirety of the zipper tape 220 (i.e. the first thick portions 121A, 121B, the second thick portions 122A, 122B, the thin portions 123A, 123B, the base strips 224A, 224B, and the engagement portions 225A, 225B) is made of the resin composition whose main component is polyethylene. The main component of the resin composition is defined in the same manner as that described in the above-described first exemplary embodiment. Further, polyethylene, which is the main component of the resin composition forming the zipper tape 220, is optionally bio-polyethylene in a form of a plant-based resin or a mixture of fossil-fuel-based polyethylene resin and bio-polyethylene in a form of a plant-based resin, without being limited to fossil-fuel-based polyethylene resin.

In the present exemplary embodiment, as in the first exemplary embodiment, the density of the thin portions 123A, 123B of the zipper tape 220 is higher than the density of the first thick portions 121A, 121B and the second thick portions 122A, 122B. Specifically, the thin-portion density is preferably in a range from 930 kg/m$^3$ to 970 kg/m$^3$ and the thick-portion density is preferably in a range from 900 kg/m$^3$ to 930 kg/m$^3$. More preferably, the thin-portion density is in a range from 940 kg/m$^3$ to 970 kg/m$^3$ and the thick-portion density is in a range from 905 kg/m$^3$ to 925 kg/m$^3$. Further preferably, the thin-portion density is in a range from 950 kg/m$^3$ to 970 kg/m$^3$ and the thick-portion density is in a range from 910 kg/m$^3$ to 925 kg/m$^3$. The density can be measured according to JIS K 7112:1999. The width and thickness of the thin portions 123A, 123B and the thickness of the first thick portions 121A, 121B and the second thick portions 122A, 122B are the same as those in the first exemplary embodiment.

Accordingly, as in the first exemplary embodiment, when a user is going to tear the bag body 110 from the notch 115 formed in one of the side seal portions 114 at an end of the zipper tape 220 in the longitudinal direction, the thin portions 123A, 123B, at which the stress concentrates, is ruptured at an early stage of the stretch of the thin portions in the present exemplary embodiment. By rupturing the zipper tape 220 at the thin portions 123A, 123B, the first area 111A and the second area 111B of the bag body 110, which are respectively bonded to the first thick portions 121A, 121B and the second thick portions 122A, 122B at both sides of the thin portions 123A,123B, are torn to form an opening in the bag body 110. Accordingly, in the present exemplary embodiment, even when the tape 220 is made of a mono-material in a form of the resin composition whose main component is polyethylene, the zipper tape 220 can be easily torn along the thin portions 123A, 123B, so that an opening can be easily formed in the bag body 110 with the zipper tape 220.

It should be noted that the resistance in tearing the bag (tearing resistance) is measurable through a trouser tear test (JIS K7128-1). A bag can be easily opened when, for instance, the tearing resistance of the zipper tape 220 is 4 N or less, and can be more easily opened when the tearing resistance of the zipper tape 220 is 3 N or less. The tearing resistance is preferably 2 N or less, more preferably 1 N or less. The lower limit of the tearing resistance, which is preferably as low as possible, is typically about 0.1 N. The tearing resistance is measurable by a method described in Examples. The tearing resistance range, which is an index for the stretch of the zipper tape 220 when being torn, is, for instance, less than 3.3 N, preferably 2.2 N or less, more preferably 1.2 N or less, further preferably 0.5 N or less, especially preferably 0.3 N or less. The lower limit of the tearing resistance range, which is not specifically limited, is typically 0 N. Appearance is likely to become more favorable with smaller stretch when the tape is torn. The tearing resistance range is also measurable by the trouser tear test according to the method described in Examples.

Figure 12:
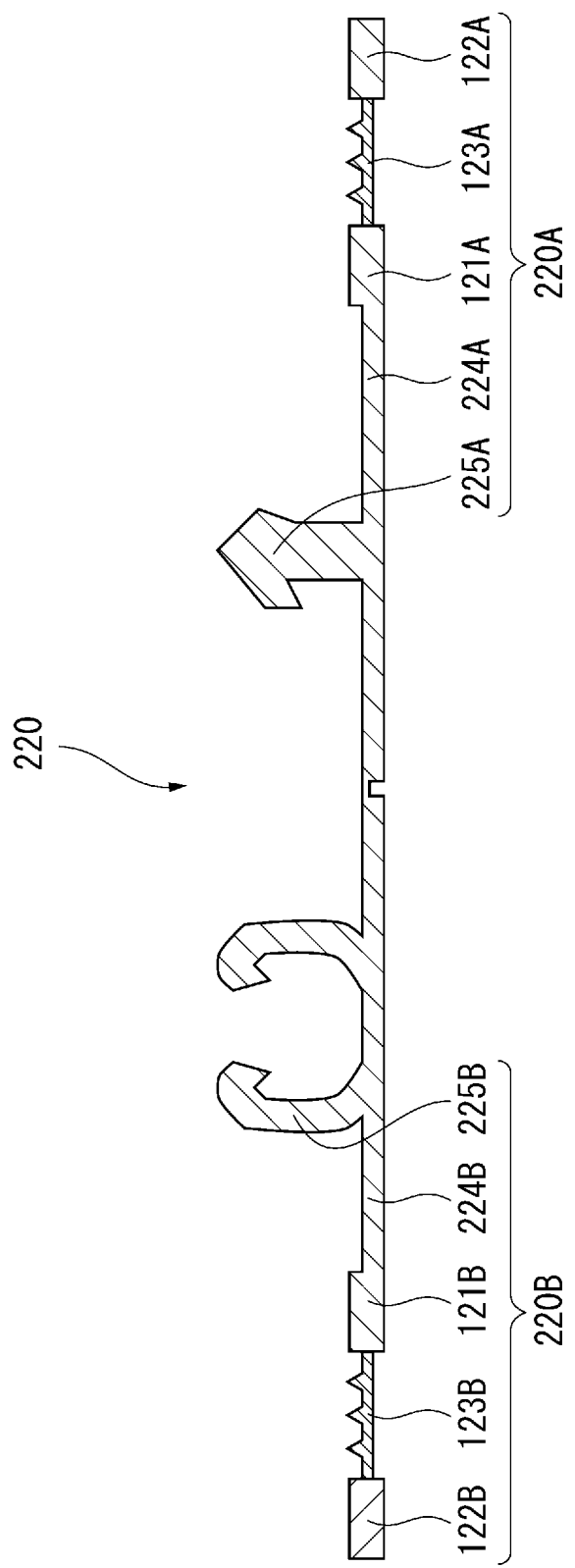
FIG. 12 is a cross sectional view showing an example of a zipper tape according to the second exemplary embodiment of the invention.

FIG. 12 is a cross sectional view showing an example of a zipper tape according to the second exemplary embodiment of the invention. The zipper tape 220, which is attached to the bag body 110 in the example described with reference to FIGS. 10 and 11, is separately provided before being attached to the bag body 110. In this case, as illustrated, the first portion 220A and the second portion 220B are optionally integrally provided (e.g. by connecting the base strips 224A, 224B). In this arrangement, the first portion 220A and the second portion 220B of the zipper tape 220 can be positioned to face each other by cutting or bending the connected part. In other words, the zipper tape 220 according to the present exemplary embodiment is not necessarily arranged so that the first portion 220A and the second portion 220B face each other when the tape 220 is supplied, but is arranged in any manner as long as the first portion 220A and the second portion 220B can be positioned to face each other.

Figure 13:
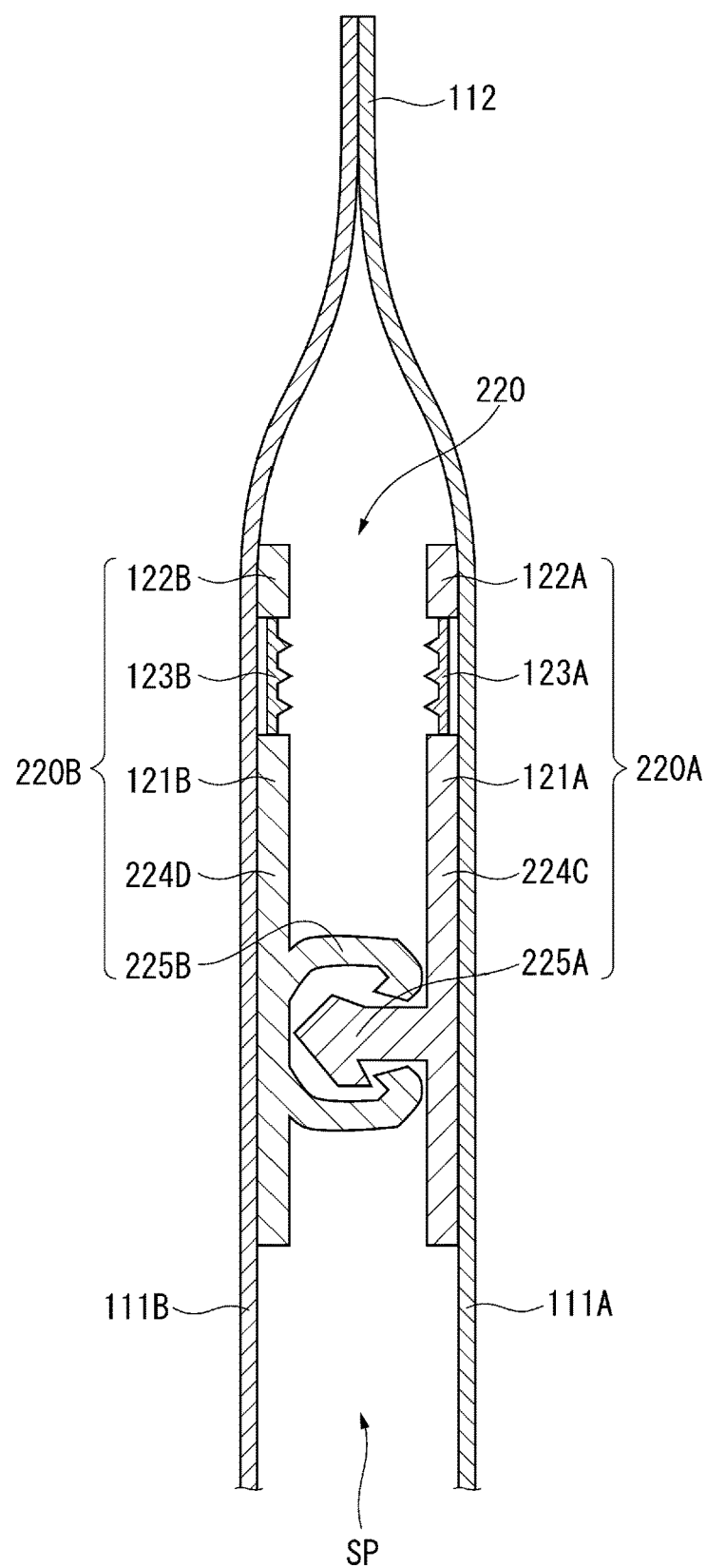
FIG. 13 is a cross sectional view showing another example of the zipper-tape bag according to the second exemplary embodiment of the invention.

FIG. 13 is a cross sectional view showing another example of the zipper-tape bag according to the second exemplary embodiment of the invention. In the example shown in FIG. 13, the base strips 224C, 224D of the zipper part have the same thickness as that of the first thick portions 121A, 121B. In the present exemplary embodiment, the first thick portions 121A, 121B are optionally continuous with and indistinguishable from the base strips 224C, 224D as in the example shown in FIG. 13. Alternatively, as in the example shown in FIG. 11, the first thick portions 121A, 121B are optionally thicker than the base strips 224A, 224B to form protrusions with respect to the base strips 224A, 224B. It should be noted that, in the example shown in FIG. 11, the thin portions 123A, 123B (portions except for the ribs) are preferably thinner than the base strips 224A, 224B, forming the thinnest portions in the first portion 120A and the second portion 120B.

It should be noted that modifications described with reference to FIGS. 5 to 9 in the above-described first exemplary embodiment are also applicable to the second exemplary embodiment. Further, the first and second thick portions and the thin portion are provided for both of the first and second portions of the tape and the zipper tape in the above-described exemplary embodiment. However, the thin portion is optionally provided for one of the first portion and the second portion in some other exemplary embodiments. For instance, when an opening is formed in the bag body using a tearing strip attached to the first portion or the second portion of the tape or the zipper tape, the thin portion is optionally formed only on one of the first portion or the second portion attached with the tearing strip. Further, in such an arrangement, it is not indispensable to position the first and second portions of the tape or the zipper tape to fully face each other. It is only required that the first and second portions of the tape or the zipper tape partially face each other.

The container body is exemplarily described as a bag-shaped bag body in the above exemplary embodiments. However, the tape or the zipper tape is optionally attached to a container body of any other shape than a bag to provide a tape-attached container or a zipper-tape container. The first thick portion, the thin portion, and the second thick portion are exemplarily continuous in the above-described examples. However, when, for instance, not only the thick portion but also the thin portion is attached to a surface of the container body, at least one disconnected portion is optionally provided between the first thick portion and the thin portion or between the thin portion and the second thick portion to provide the tape or the zipper tape in a form of a combination of a plurality of elongated components.

EXAMPLES

Openability of the zipper tape according to the second exemplary embodiment of the invention described above with reference to FIG. 11 was evaluated.

In the zipper tape according to Example 1, the material of the thick portion was linear low-density polyethylene whose density was 913 kg/m$^3$ and melt flow rate was 4.0 g/10 min, and the material of the thin portion was high-density polyethylene whose density was 953 kg/m$^3$ and melt flow rate was 5.0 g/10 min. The material compositions were extruded and molded through an extruder and were subsequently water-cooled to prepare a zipper tape. The thick portion of the zipper tape had a film thickness of 330 μm and a length in the width direction of 19 mm. The thin portion of the zipper tape had a film thickness of 60 μm and a length in the width direction of 3 mm.

In the zipper tape according to Example 2, the material of the thick portion was linear low-density polyethylene whose density was 913 kg/m$^3$ and melt flow rate was 4.0 g/10 min, and the material of the thin portion was high-density polyethylene whose density was 963 kg/m$^3$ and melt flow rate was 5.0 g/10 min. The material compositions were extruded and molded through an extruder and were subsequently water-cooled to prepare a zipper tape. The thick portion of the zipper tape had a film thickness of 330 μm and a length in the width direction of 19 mm. The thin portion of the zipper tape had a film thickness of 60 μm and a length in the width direction of 3 mm.

In the zipper tape according to Example 3, the material of the thick portion was linear low-density polyethylene whose density was 920 kg/m$^3$ and melt flow rate was 4.0 g/10 min, and the material of the thin portion was high-density polyethylene whose density was 946 kg/m$^3$ and melt flow rate was 5.0 g/10 min. The material compositions were extruded and molded through an extruder and were subsequently water-cooled to prepare a zipper tape. The thick portion of the zipper tape had a film thickness of 340 μm and a length in the width direction of 19 mm. The thin portion of the zipper tape had a film thickness of 60 μm and a length in the width direction of 3 mm.

In the zipper tape according to Example 4, the material of the thick portion was linear low-density polyethylene whose density was 920 kg/m$^3$ and melt flow rate was 4.0 g/10 min, and the material of the thin portion was high-density polyethylene whose density was 931 kg/m$^3$ and melt flow rate was 5.0 g/10 min. The material compositions were extruded and molded through an extruder and were subsequently water-cooled to prepare a zipper tape. The thick portion of the zipper tape had a film thickness of 340 μm and a length in the width direction of 19 mm. The thin portion of the zipper tape had a film thickness of 60 μm and a length in the width direction of 3 mm.

In the zipper tape according to Example 5, the material of the thick portion was linear low-density polyethylene whose density was 920 kg/m$^3$ and melt flow rate was 4.0 g/10 min, and the material of the thin portion was high-density polyethylene whose density was 953 kg/m$^3$ and melt flow rate was 5.0 g/10 min. The material compositions were extruded and molded through an extruder and were subsequently water-cooled to prepare a zipper tape. The thick portion of the zipper tape had a film thickness of 360 μm and a length in the width direction of 19 mm. The thin portion of the zipper tape had a film thickness of 100 μm and a length in the width direction of 3 mm.

In the zipper tape according to Example 6, the material of the thick portion was linear low-density polyethylene whose density was 920 kg/m$^3$ and melt flow rate was 4.0 g/10 min, and the material of the thin portion was high-density polyethylene whose density was 953 kg/m$^3$ and melt flow rate was 5.0 g/10 min. The material compositions were extruded and molded through an extruder and were subsequently water-cooled to prepare a zipper tape. The thick portion of the zipper tape had a film thickness of 380 μm and a length in the width direction of 19 mm. The thin portion of the zipper tape had a film thickness of 120 μm and a length in the width direction of 3 mm.

In a zipper tape according to Comparative 1, the material of the thick portion and the thin portion was linear low-density polyethylene whose density was 920 kg/m$^3$ and melt flow rate was 4.0 g/10 min. The material composition was extruded and molded through an extruder and was subsequently water-cooled to prepare a zipper tape. The thick portion of the zipper tape had a film thickness of 340 μm and a length in the width direction of 19 mm. The thin portion of the zipper tape had a film thickness of 60 μm and a length in the width direction of 3 mm.

Evaluation results of the tear test of Examples and Comparative are shown in Table 1. The details of the evaluation test are described below.

Tearing Resistance

The tearing resistance of the zipper tape was measured by a test of tearing the zipper tape in a longitudinal direction using a test machine (AGS-X 1 kN manufactured by Shimadzu Corporation) adapted for a trouser tear test (JIS K7128-1). Specific steps include cutting the zipper tape into 150-mm width pieces, making a notch of 75-mm length into the thin portion of each of the pieces, and setting the pieces to the tensile test machine. Then, the pieces were pulled in up-down directions at a rate of 200 mm/min and an average of the tearing resistance of remnant 50-mm section (i.e. excluding 20-mm section after the start of tearing and 5-mm section before the end of tearing) was calculated.

Stretch when being Torn

The stretch of the zipper tape when being torn was evaluated in terms of tearing resistance range [N] (i.e. a difference between maximum and minimum values of the measurements of the tearing resistance in the remnant 50-mm section excluding 20-mm section at the start of tearing and 5-mm section before the end of the tearing during the above trouser tear test). Table 1 shows the tearing resistance ranges of Examples and Comparative. It is determined that a smaller tearing resistance range leads to smaller stretch of the zipper tape when being torn, allowing smoother opening process and providing more excellent appearance after being opened.

TABLE 1

Evaluation Results of Tearing Test for Examples and Comparative

| | Thick-Portion Density [$kg/m^3$] | Thin-Portion Density [$kg/m^3$] | Thickness of Thick Portion [μm] | Thickness of Thin Portion [μm] | Tearing Resistance [N] | Tearing Resistance Range [N] |
|---|---|---|---|---|---|---|
| Ex. 1 | 913 | 953 | 330 | 60 | 0.96 | 0.285 |
| Ex. 2 | 913 | 963 | 330 | 60 | 1.45 | 0.233 |
| Ex. 3 | 920 | 946 | 340 | 60 | 1.28 | 0.345 |
| Ex. 4 | 920 | 931 | 340 | 60 | 2.06 | 2.345 |
| Ex. 5 | 920 | 953 | 360 | 100 | 2.31 | 0.090 |
| Ex. 6 | 920 | 953 | 380 | 120 | 2.75 | 0.111 |
| Comp. 1 | 920 | 920 | 340 | 60 | 2.25 | 3.356 |

As a result of the above tear test, the zipper tape was torn along the thin portion. In Examples 1 to 4, the tearing resistance was in a range from 0.96 N to 2.06 N, which was lower than Comparative 1 (2.25 N). In these Examples, appearance after the tape was torn was improved more than Comparative. Examples 5 and 6 showed higher tearing resistance than Comparative. However, the stretch after the tape was torn was improved more than Comparative. Specifically, the tearing resistance range was 3.356 N in Comparative 1. The tearing resistance range in all of Examples 1 to 6 was smaller than Comparative 1 (less than 3.3 N). In view of the results shown in Table 1, examples of the tearing resistance range are preferably 2.2 N or less, more preferably 1.2 N or less, further preferably 0.5 N or less, especially preferably 0.3 N or less. From the results, it is confirmed that the exemplary embodiment of the invention, in which high-density polyethylene was used for the thin portion, can smoothly tear the tape or the zipper tape along the thin portion.

Suitable exemplary embodiments of the invention have been detailed above with reference to the attached drawings. However, the scope of the invention is not limited to these exemplary embodiments. It would be obvious for those skilled in the art to which the invention pertains that various modifications and revisions are conceivable within the technical idea described within claims, and it is understood that such modifications and revisions are naturally within the technical scope of the invention.

The invention claimed is:

1. A tape having a cross sectional profile comprising a first thick portion, a second thick portion, and a thin portion provided between the first and second thick portions, wherein
   the first and second thick portions and the thin portion are made of a respective resin composition whose main component is polyethylene,
   a density of at least a part of the thin portion is higher than both a density of the first thick portion and a density of the second thick portion, wherein the thin portion is suitable for rupturing the thin portion when the tape is torn along a longitudinal direction of the tape, and
   the thin portion comprises a plurality of ribs provided on at least one side of the thin portion, the plurality of ribs extending in a longitudinal direction of the tape, and wherein individual ribs of the plurality of ribs protrude in a thickness direction of the tape.

2. The tape according to claim 1, wherein the density of the at least a part of the thin portion is in a range from 930 $kg/m^3$ to 970 $kg/m^3$.

3. The tape according to claim 1, wherein a density of at least a part of the first and second thick portions is in a range from 900 $kg/m^3$ to 930 $kg/m^3$.

4. The tape according to claim 1, wherein the tape has a tearing resistance of 4 N or less.

5. The tape according to claim 1, wherein the tape has a tearing resistance range of less than 3.3 N.

6. The tape according to claim 1, wherein at least one of the first thick portion, the second thick portion, or the thin portion is made of a resin composition comprising bio-polyethylene.

7. The tape according to claim 1, wherein the cross sectional profile comprises a first portion and a second portion configured to at least partially face each other, and
   at least one of the first portion or the second portion comprises the first and second thick portions and the thin portion in a cross sectional profile thereof.

8. A tape-attached container comprising:
   a container body at least comprising a first area and a second area that face each other, and
   the tape according to claim 7, at least a part of the first portion of the tape being bonded to the first area and at least a part of the second portion of the tape being bonded to the second area.

9. The tape-attached container according to claim 8, wherein the container body is bag-shaped.

10. The tape-attached container according to claim 8, wherein the thin portion is provided with a rib extending in a longitudinal direction of the tape and protruding in a thickness direction of the tape, and a top of the rib is bonded to the first area or the second area.

11. The tape-attached container according to claim 8, wherein a seal portion adjacent to an outer periphery of the container body is provided to an end of the tape in the longitudinal direction, the first and second portions and the first and second areas being thermally fused at the seal portion, and
a thin seal portion that traverses the seal portion along the longitudinal direction of the tape is provided.

12. A tape comprising a first portion and a second portion in a cross sectional profile thereof, the first and second portions being configured to at least partially face each other,
wherein each of the first and second portions comprises in a cross sectional profile thereof a base strip and an engagement portion protruding from the base strip, the engagement portion of the first portion and the engagement portion of the second portion being engageable with each other,
the cross sectional profile of at least one of the first portion or the second portion further comprises a first thick portion continuous with the base strip, a second thick portion, and a thin portion provided between the first and second thick portions,
the engagement portion, the base strip, the first and second thick portions, and the thin portion are made of a respective resin composition whose main component is polyethylene,
a density of at least a part of the thin portion is higher than both a density of the first thick portion and a density of the second thick portion, wherein the thin portion is suitable for rupturing the thin portion when the tape is torn along a longitudinal direction thereof, and
the thin portion comprises a plurality of ribs provided on at least one side of the thin portion, the plurality of ribs extending in a longitudinal direction of the tape, and wherein individual ribs of the plurality of ribs protrude in a thickness direction of the tape.

13. The tape according to claim 12, wherein the first thick portion is thicker than the base strip.

14. The tape according to claim 12, wherein the density of the at least a part of the thin portion is in a range from 930 kg/m$^3$ to 970 kg/m$^3$.

15. The tape according to claim 12, wherein a density of at least a part of the first and second thick portions is in a range from 900 kg/m$^3$ to 930 kg/m$^3$.

16. The tape according to claim 12, wherein the tape has a tearing resistance of 4 N or less.

17. The tape according to claim 12, wherein the tape has a tearing resistance range of less than 3.3 N.

18. The tape according to claim 12, wherein at least one of the engagement portion, the base strip, the first thick portion, the second thick portion, or the thin portion is made of a resin composition comprising bio-polyethylene.

19. A tape-attached container comprising:
a container body at least comprising a first area and a second area that face each other, and
the tape according to claim 12, at least a part of the first portion of the tape being bonded to the first area and at least a part of the second portion of the tape being bonded to the second area.

20. The tape-attached container according to claim 19, wherein the container body is bag-shaped.

21. A tape comprising a first portion and a second portion in a cross sectional profile thereof, the first and second portions being configured to at least partially face each other,
wherein each of the first and second portions comprises in a cross sectional profile thereof, a first thick portion, a second thick portion, and a thin portion provided between the respective first and second thick portions,
the first and second thick portions and the thin portion of both the first portion and the second portion are made of a respective resin composition whose main component is polyethylene,
a density of at least a part of the thin portion of the first portion is higher than both a density of the first thick portion of the first portion and a density of the second thick portion of the first portion, wherein the thin portion of the first portion is suitable for rupturing the thin portion of the first portion when the tape is torn along a longitudinal direction of the tape, and
a density of at least a part of the thin portion of the second portion is higher than both a density of the first thick portion of the second portion and a density of the second thick portion of the second portion, wherein the thin portion of the second portion is suitable for rupturing the thin portion of the second portion when the tape is torn along a longitudinal direction of the tape.

\* \* \* \* \*